United States Patent [19]

Andresen et al.

[11] Patent Number: 5,659,407
[45] Date of Patent: Aug. 19, 1997

[54] METHOD AND SYSTEM FOR RENDERING ACHROMATIC IMAGE DATA FOR IMAGE OUTPUT DEVICES

[75] Inventors: Kevin W. Andresen, Campbell; Robert C. Fishman; Ted W. Walker, both of Sunnyvale, all of Calif.

[73] Assignee: Apple Computer, Inc., Calif.

[21] Appl. No.: 483,453

[22] Filed: Jun. 6, 1995

[51] Int. Cl.[6] .................................. H04N 1/46; B41J 2/21
[52] U.S. Cl. ........................... 358/530; 358/518; 358/524; 358/529; 395/109
[58] Field of Search ........................ 358/518, 500, 358/530, 515, 501, 520, 524, 529, 538, 540, 296; 395/131, 104, 109; 382/162, 167; 345/153, 154, 201; H04N 1/46; B41J 2/21

[56] References Cited

U.S. PATENT DOCUMENTS

| | | | |
|---|---|---|---|
| 4,812,899 | 3/1989 | Kueppers | 358/75 |
| 5,208,663 | 5/1993 | Hiratsuka et al. | 358/75 |
| 5,233,684 | 8/1993 | Ulichney | 395/131 |
| 5,361,144 | 11/1994 | Sugiura | 358/500 |
| 5,383,037 | 1/1995 | Kimura et al. | 358/539 |
| 5,465,161 | 11/1995 | Funada et al. | 358/438 |

FOREIGN PATENT DOCUMENTS

| | | |
|---|---|---|
| 0395032 | 10/1990 | European Pat. Off. . |
| 0660583 | 6/1995 | European Pat. Off. . |
| 5-286170 | 11/1993 | Japan . |
| 7095416 | 4/1995 | Japan . |

Primary Examiner—Thomas L. Stoll
Attorney, Agent, or Firm—Burns, Doane, Swecker & Mathis

[57] ABSTRACT

To reduce rendering time for an image to be generated, an image to be generated, such as a page of a document, is divided into non-overlapping regions. Within each region, a determination is made whether all of the data contained therein is achromatic. If so, achromatic data is rendered for a single component of a multi-component color space. Pixel values are stored in one section of a frame buffer that relates to the single component. The other components of the color space use multiple references to the pixel data stored in this one section, rather than being separately rendered.

12 Claims, 6 Drawing Sheets

METHOD AND SYSTEM FOR RENDERING ACHROMATIC IMAGE DATA FOR IMAGE OUTPUT DEVICES

FIELD OF THE INVENTION

The present invention is directed to imaging systems, and more particularly to the manner in which achromatic data is rendered to produce an image on image output devices in such systems.

BACKGROUND OF THE INVENTION

Output devices for imaging systems, such as display monitors and printers, typically represent colors within the context of a device color space. A color space reflects the particular characteristics of the manner in which a device produces a color image. Generally, monitors which employ cathode ray tubes define color in an RGB (red-green-blue) color space, since they generate color images by means of electron guns which excite red, blue and green phosphors. In contrast, color printers define colors in terms of a CMY (cyan-magenta-yellow) color space, since they generate color images by means of cyan, magenta and yellow inks or toners. A color which is specified in a particular color space is made up of individual components characteristic of that color space. Thus, for example, a color in the RGB color space is comprised of red, green and blue components, whereas a color in the CMY color space comprises cyan, magenta and yellow components. In each of these color spaces, achromatic data, i.e. black, white and shades of gray, are represented by equal amounts of each component. For example, white might be represented by 100% saturation of each of the red, green and blue components in the RGB color space, whereas 50% gray is made up of 50% red saturation, 50% green saturation and 50% blue saturation. The percentage of saturation represents the intensity with which a component is displayed on a medium, such as the density of ink on a paper or the degree of excitation provided by an electron gun.

Printers and monitors operate as raster devices, whose output images comprise a two-dimensional grid of picture elements, or pixels. To generate an image on a screen or a page, these devices store a representation in memory of a display value for each pixel in the image. This stored representation of the image is referred to as a "pixel map" (sometimes abbreviated as "pixmap"), or a "frame buffer". The display value for each pixel comprises multiple components, e.g. red, green and blue components for an RGB monitor. To display a 50% gray square, for example, the display values for each of the pixels covered by the square indicate a 50% intensity for each of the three components.

In the operation of an exemplary imaging system, a user might be running a graphics application program on a computer. The user can instruct the program to draw an object, such as a square, at a particular location on the screen of the display monitor. The user might also designate that the square be filled with a certain color, such as 50% gray. In response to these user inputs, the graphics program issues high-level instructions to the computer's operating system to draw a 50% gray square. A display manager, or similar such portion of the computer's operating system for controlling the operation of the display monitor, interprets the command to draw a 50% gray square into low-level instructions for the display monitor. As part of this interpretation process, the high level description of the gray square from the application program is translated into individual pixel display values that are stored in the frame buffer.

This process of converting the high level graphical data into pixel values is known as rendering. In a device which employs a three-dimensional color space, such as RGB or CMY, the frame buffer is comprised of three sections, e.g., planes, which respectively relate to the three components. For each pixel of an image, the rendering process involves the steps of determining the display value for one of the components, e.g. the red component, storing that value at an appropriate location in the corresponding section of the frame buffer, and repeating these steps for each of the other two components. In other words, each of the three color space components is individually rendered for each pixel.

In the past, various approaches have been employed to increase the efficiency with which achromatic images e.g., black and white images, are rendered and displayed. For example, some printers use a CMYK (cyan-magenta-yellow-black) color representation, in which a black component is maintained separately from the other three color components. This approach has been employed for two main reasons. First, the composite color resulting from a combination of cyan, magenta and yellow inks rarely results in a good quality of black. Secondly, since much of the data on a printed page is black, for example text and line art, less ink and less rendering is required to print the image. This is due to the fact that in a CMYK color representation, black text and line art only needs to be rendered in a single plane, namely the black plane.

Not all printers are designed to operate with a CMYK color representation, however, and therefore cannot employ this approach. Similarly, other output devices which do not have a separate black component, such as display monitors, likewise cannot operate in this fashion. For these types of color output devices, another approach that has been employed in the past is to selectively configure them as monochrome devices. In such a mode of operation, only a single component of the color space is employed, to represent shades of gray from white to black. A smaller frame buffer can be used, and only one component of the color space needs to be rendered. This approach has two appreciable disadvantages, however. First, it requires explicit intervention by the user. Secondly, when configured for monochrome operation, the device is incapable of generating a chromatic image.

SUMMARY OF THE INVENTION

Since achromatic data such as black and white text and line art occurs relatively frequently in printed and displayed documents, it is desirable to optimize the performance of color output devices such as RGB monitors and CMY printers with respect to the rendering and display of such data. The present invention provides improved rendering performance for achromatic data on color output devices, while avoiding the need to configure such devices to operate in a monochrome mode. The invention is based on the fact that the display values for achromatic data are identical for each component of a color space. In accordance with the present invention, achromatic data is rendered for a single component of the color space, i.e. pixel values are stored in one of the sections of the frame buffer. The other components of the color space respectively make reference to the pixel data stored in this one section as well, rather than being separately rendered. For a three-dimensional color space, such as RGB or CMY, only one third of the rendering steps are required, resulting in a significant performance improvement.

In a preferred embodiment of the invention, an image to be generated, such as a page of a document, is divided into non-overlapping regions. Within each region, a determination is made whether all of the data contained therein is achromatic. If so, the streamlined rendering process of the present invention can be employed. With this approach, if a page comprises primarily achromatic data, and has only a small portion containing color, the improved rendering process of the present invention can be applied to most of the data contained on the page, to thereby provide increased performance.

The present invention can be employed in image generating systems of the type where the image data is converted to an intermediate form, such as a display list or a metafile, before being rendered. It is also applicable to systems in which the image data is dynamically rendered as it is received from the source of image information, such as an application program.

Further features of the invention, as well as the advantages attained thereby, are described in greater detail hereinafter with reference to preferred embodiments illustrated in the accompanying drawings.

DETAILED DESCRIPTION

To facilitate an understanding of the present invention, it is described hereinafter in the context of a specific embodiment. In particular, reference is made to the implementation of the invention in a color printer which employs a CMY color space to represent colors. It will be appreciated, however, that the practical applications of the invention are not limited to this particular embodiment. Rather, the invention can be employed in other types of color output devices, such as CRT monitors and LCD display screens which employ any of a variety of multi-component color spaces. Further in this regard, it is not limited to output devices. Rather, the principles of the invention can also be employed in graphics application programs, for example, which process image data according to its respective color components.

Figure 1:
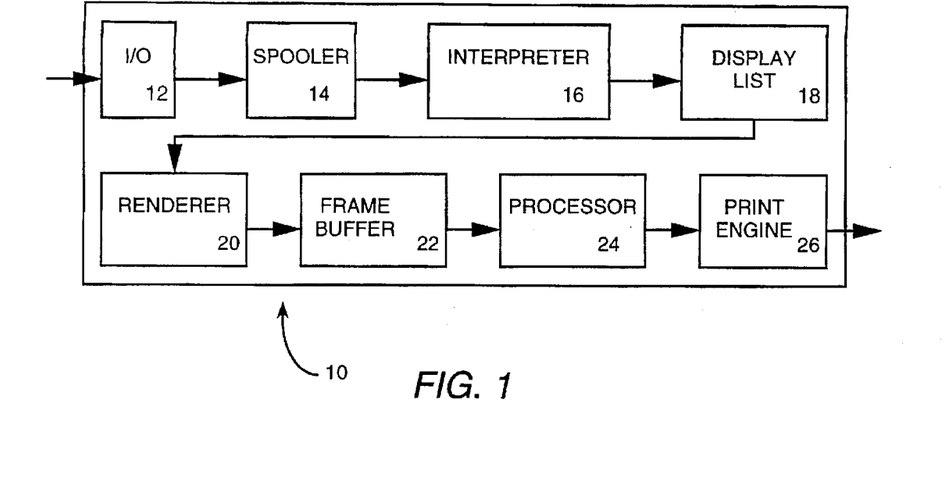
FIG. 1 is a block diagram of the main subsystems which make up a color printer of the type in which the present invention can be employed.

FIG. 1 is a block diagram of the major components of a color printer, of a type in which the present invention can be implemented. Referring thereto, the printer 10 includes an I/O controller 12 that is connected to one or more I/O ports for communication with computers and other external sources of data to be printed. A spooler 14 accumulates image data received from the external sources, and stores the data until it is ready to be processed for printing. It will be appreciated, of course, that the spooler is optional and can be incorporated in an external device, rather than the printer itself. An interpreter 16 receives the image data and issues calls which cause the desired image to be drawn, or printed, on the paper. These calls can be of two basic types. One set of calls identifies the appearance state of objects to be drawn. This appearance state indicates the color of the object, as well as other appearance-related factors, such as patterns or the like. The other set of calls describes the object to be drawn, such as a rectangle, a particular character of text, or the like. Such a description might include the location of the object in the image, as well as its size. In the illustrated embodiment of the printer, these calls are stored in an intermediate form, known as a display list 18, or a metafile.

The information on the display list is provided to a renderer 20. The renderer converts the image data from the interpreter 16 into individual pixel display values, which are stored in a frame buffer 22. The pixel display values stored in the frame buffer can undergo optional processing within one or more processors 24. For example, the display values can be compressed and/or decompressed, or undergo halftone processing. Ultimately, these display values are supplied to a print engine 26, to control the actual printing of the desired image. The print engine could be of the laser beam printer type or the ink jet type, for example.

In an alternative embodiment of a printer, the display list 18 can be eliminated. In this embodiment, image data from the interpreter 16 is directly fed to the renderer 20, to be dynamically rendered as it is received.

Figure 2:
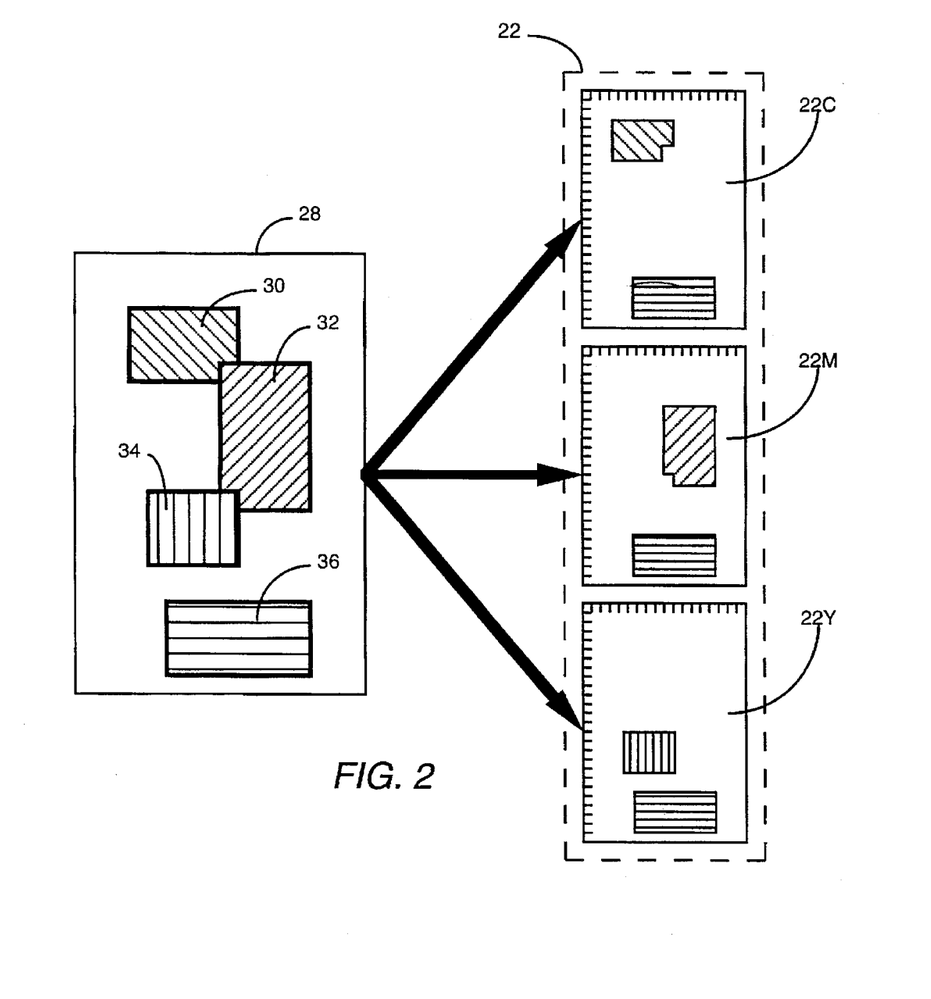
FIG. 2 is a schematic illustration of the rendering process.

The process which is undertaken in the renderer 20 is illustrated in greater detail in FIG. 2. An exemplary document 28 to be printed on the printer contains four objects. For the sake of simplicity, these object are represented as solid rectangles. In practice, the object can be any geometric shape, lines, or characters of text. In this particular example, each object has a different color, as represented by the different shading. The rectangle 30 is cyan, the rectangle 32 is magenta, the rectangle 34 is yellow, and the rectangle 36 is black.

The frame buffer 22 is comprised of three sections, or address spaces, 22C, 22M and 22Y, which respectively correspond to the three color components of the printer's color space. In essence, each section comprises a pixel map, having a storage location for each pixel in the image to be generated, as represented by the grid marks along the edges of each plane. In the illustrated embodiment, the sections of the frame buffer are shown as separate planes. In practice, the color component information for the pixels can be stored in any desired form. For example, the three color component values for a pixel can be stored together as three contiguous bytes in the memory.

In operation, the interpreter 16 issues a call to set the state of the printer to print the color cyan, and then issues a call to draw the rectangle 30. In response to the calls to draw the cyan rectangle 30, the renderer 20 stores information in the frame buffer section 22C which identifies each pixel in the image that is to contain the color cyan. This stored information includes the saturation value, or intensity, for the displayed color at the respective pixel.

The renderer 20 operates in a similar manner for the calls pertaining to the drawing of the magenta rectangle 32 and the yellow rectangle 34. In particular, information pertaining to the saturation value of the magenta rectangle 32 is stored at appropriate address locations in the magenta section 22M of the frame buffer, and saturation values for the yellow rectangle 34 are stored in the yellow section 22Y of the frame buffer.

In a device which employs a CMY color space, the color black is represented by 100% saturation of each of the cyan, magenta and yellow components. Therefore, in response to the calls to draw the black rectangle 36, the renderer 20 stores the appropriate saturation information at the same location in each of the three frame buffer sections 22C, 22M and 22Y.

Once all of the information for the page of data is stored in the frame buffer 22, it is provided to the print engine 26, with any optional intermediate processing. More particularly, the information from each of the three frame buffer sections 22C, 22M and 22Y of the frame buffer is individually provided to the print engine in three separate steps. For example, all of the cyan information may be printed, followed by all of the magenta information and then all of the yellow information, to form a composite image.

In the foregoing example, it can be seen that the information that is rendered and stored in the frame buffer 22 for the black rectangle 36 is the same for each of the three color planes. More generally, for achromatic data representing the colors black, white and shades of gray, the saturation value for each of the three color components is the same. Thus, for example, pure black is represented by 100% cyan, 100% magenta and 100% yellow, pure white is represented by 0% cyan, 0% magenta and 0% yellow, and 50% gray is represented by 50% cyan, 50% magenta and 50% yellow. In accordance with the present invention, this phenomenon is utilized in a manner which provides a more efficient rendering process for achromatic data.

Generally speaking, in the implementation of the present invention, a segment of image data, such as a page or a portion of a page, is analyzed to determine whether it contains only achromatic information. Such analysis can be carried out, for example, by examining the calls issued by the interpreter 16. If each call for a color state indicates only achromatic color, the image data for that segment of information only needs to be rendered for one section of the frame buffer. For example, the image data can be rendered into the cyan section 22C. The image data for the other two sections can be obtained by multiple references to the cyan section, and need not be separately rendered. To implement this operation, a data structure is created which contains pointers, or other analogous forms of reference, to the three frame buffer sections, one for each component of the color space. This data structure is referred to herein as a frame buffer array. The data to be sent to the print engine is determined by the references in the frame buffer array.

Figure 3A:
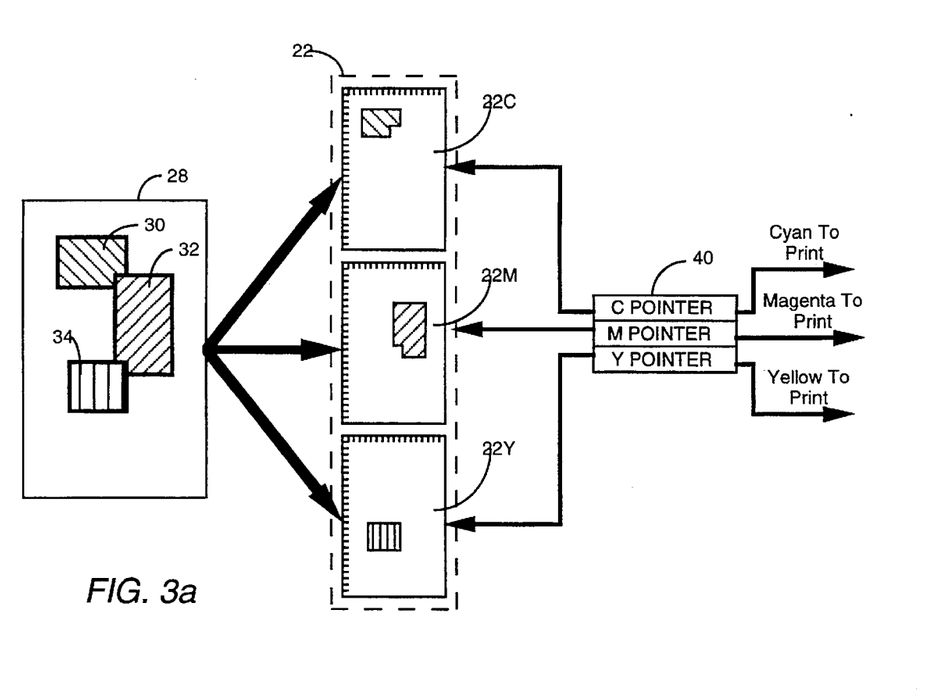
FIGS. 3a and 3b are examples of chromatic and achromatic rendering according to the present invention.
Figure 3B:
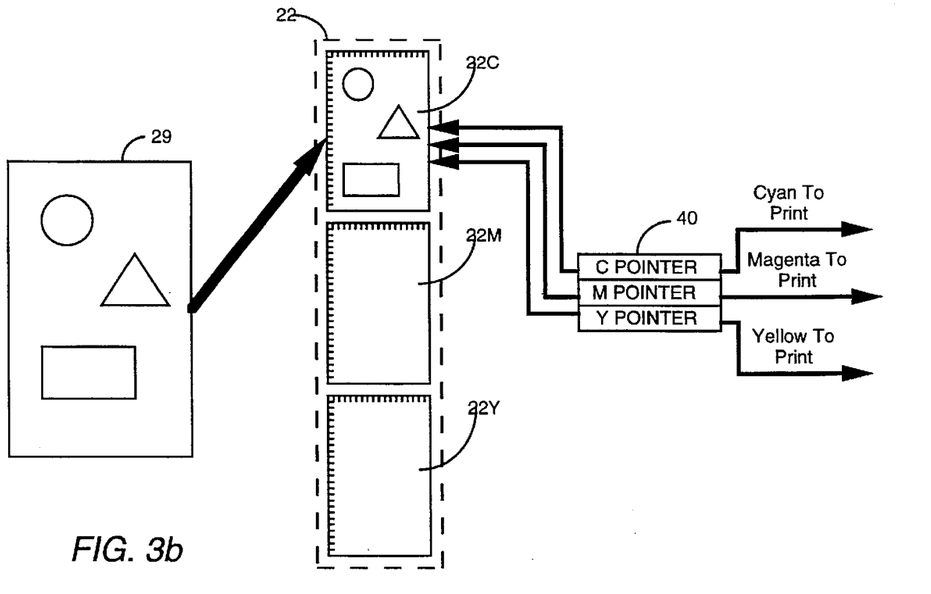

This concept is further illustrated by means of two examples depicted in FIGS. 3a and 3b. FIG. 3a pertains to an example in which the image data contains chromatic information, such as the three colored rectangles 30, 32 and 34. In this case, the three sections of the frame buffer contain respectively different information. A frame buffer array 40 contains pointers to the respective frame buffer planes that are to be employed for each of the three color components. Specifically, as each color component is being printed by the print engine, the pointer in the frame buffer array identifies the location where the pixel data for that color is stored in the frame buffer. In the example represented in FIG. 3a, the color component information is different for the three respective colors, since the image contains chromatic data. Accordingly, the pointers for cyan, magenta and yellow respectively point to the three different sections of the frame buffer.

FIG. 3b represents an example in which an image 29 is comprised solely of achromatic data, such as black and white text or a grayscale graphic drawing. In this case, the saturation values for each of the three color components is the same. In accordance with the present invention, the saturation values for one of the three components is rendered and stored in the corresponding section of the frame buffer, e.g. the cyan section 22C. No rendering takes place for the other two components. Rather, the three pointers in the frame buffer array 40 all refer to the same address range 22C of the frame buffer. In other words, as each of the cyan, magenta and yellow color components is printed, the same information is retrieved each time from the cyan frame buffer section, to produce the grayscale image. It can be seen that, with this approach, the rendering time is reduced by two-thirds, thereby increasing the overall processing efficiency of the printer.

Figure 4:
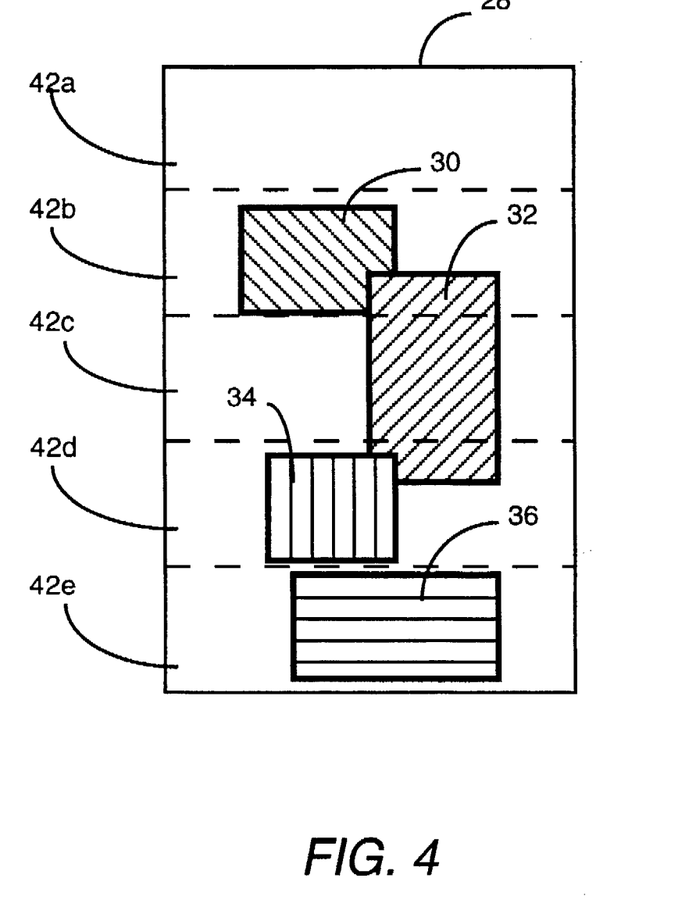
FIG. 4 is an illustration of the division of a page into bands.

In a preferred embodiment of the invention, a page of image data is divided into non-overlapping areas. For example, as shown in FIG. 4, each area can comprise a horizontal band 42a–42e that encompasses a percentage of the image. While five such bands are shown in FIG. 4, in practice the page can be divided into any desirable number of areas. Further in this regard, the areas need not be horizontal bands. They can have any shape, as long as they are capable of covering the entire page. The data in the display list is sorted by area, and the analysis of the page to determine whether it contains achromatic data can be carried out on a band-by-band basis. In the example of FIG. 4, the first band 42a is all white, and therefore contains only achromatic data. The next three bands 42b, 42c and 42d are comprised of the colored objects 30, 32 and 34, and therefore undergo normal color image rendering process. The last band 42e, which includes the black rectangle 36, contains only achromatic data, and can therefore be processed in a streamlined manner, according to the present invention.

Figure 5A:
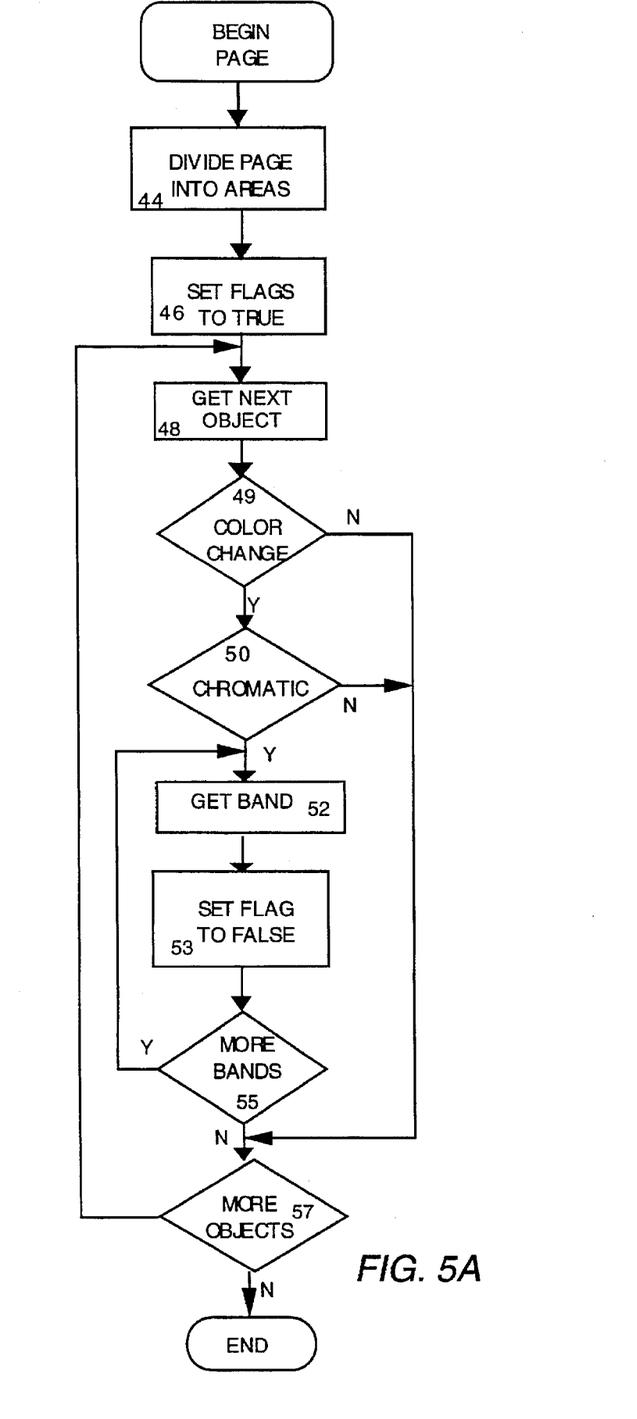
FIGS. 5A and 5B are flowcharts of the process of the present invention for a printer which utilizes a display list.
Figure 5B:
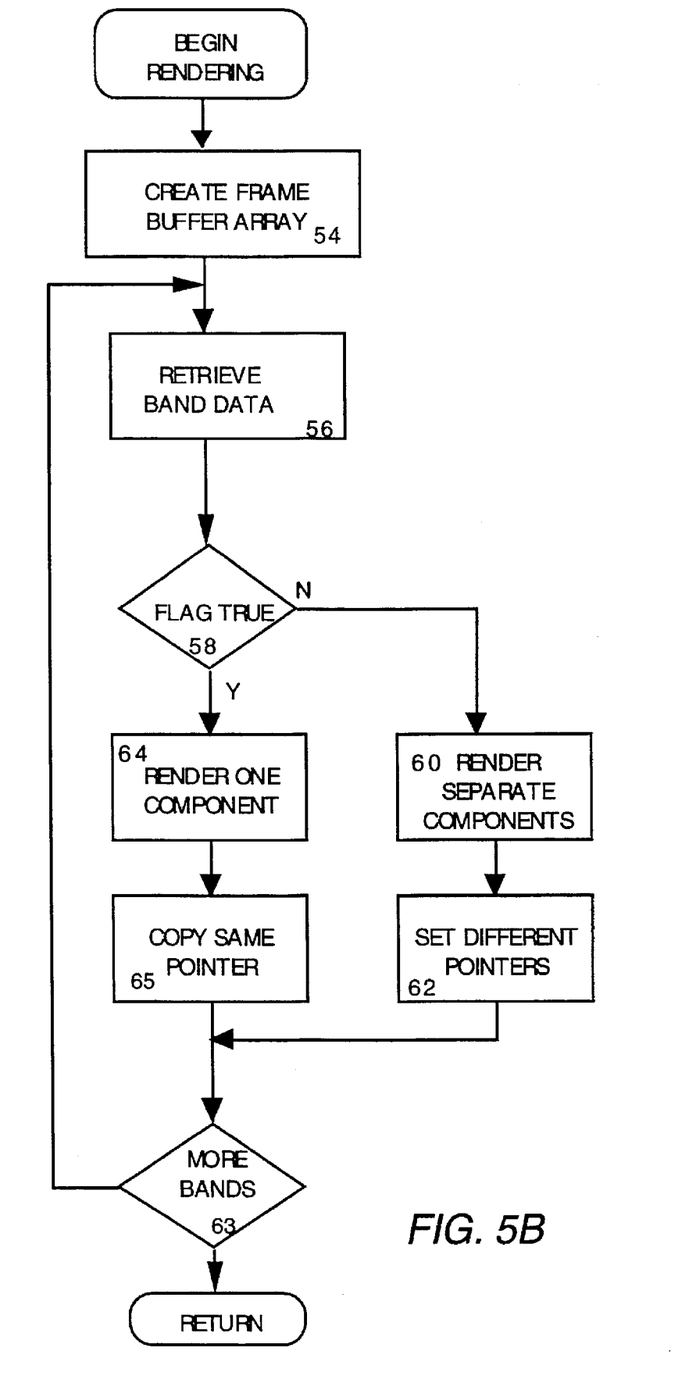

A flowchart which depicts the rendering process of the present invention is illustrated in FIGS. 5A and 5B. FIG. 5A relates to the portion of the process in which the calls from the interpreter are captured and stored in the display list. FIG. 5B relates to the phase in which the calls are played back from the display list. As a first step 44, a page of image data is divided into one or more non-overlapping areas. An achromatic state flag is set to the true state for each area at step 46. Subsequently, each call for an object that is specified by the interpreter is inspected at steps 48 and 49, to determine whether it requires a change in color. If so, a determination is made whether the new color is chromatic at step 50. If so, the achromatic state flag is set to false at steps 52 and 53 for each area that contains the object with the new color. This procedure is repeated for each object that is stored in the display list.

At render time (FIG. 5B), the frame buffer array is created at step 54, with pointers to the three frame buffer sections, to be referenced by the print engine. As data is retrieved from the display list 18 for one of the image areas, at step 56, the achromatic state flag is examined at step 58 for its corresponding area. If the flag is set to the false condition, the data for that area is rendered into three distinct frame buffer sections at step 60, and the frame buffer array is loaded with pointers to each of the three respective frame buffer sections at step 62. Alternatively, if the area's achromatic state flag is true, the data is rendered into a single frame buffer section at step 64, and the frame buffer array is set at step 65 so that the pointer to the single frame buffer section into which the rendering took place is copied for all three components, as shown in FIG. 3b.

Figure 6:
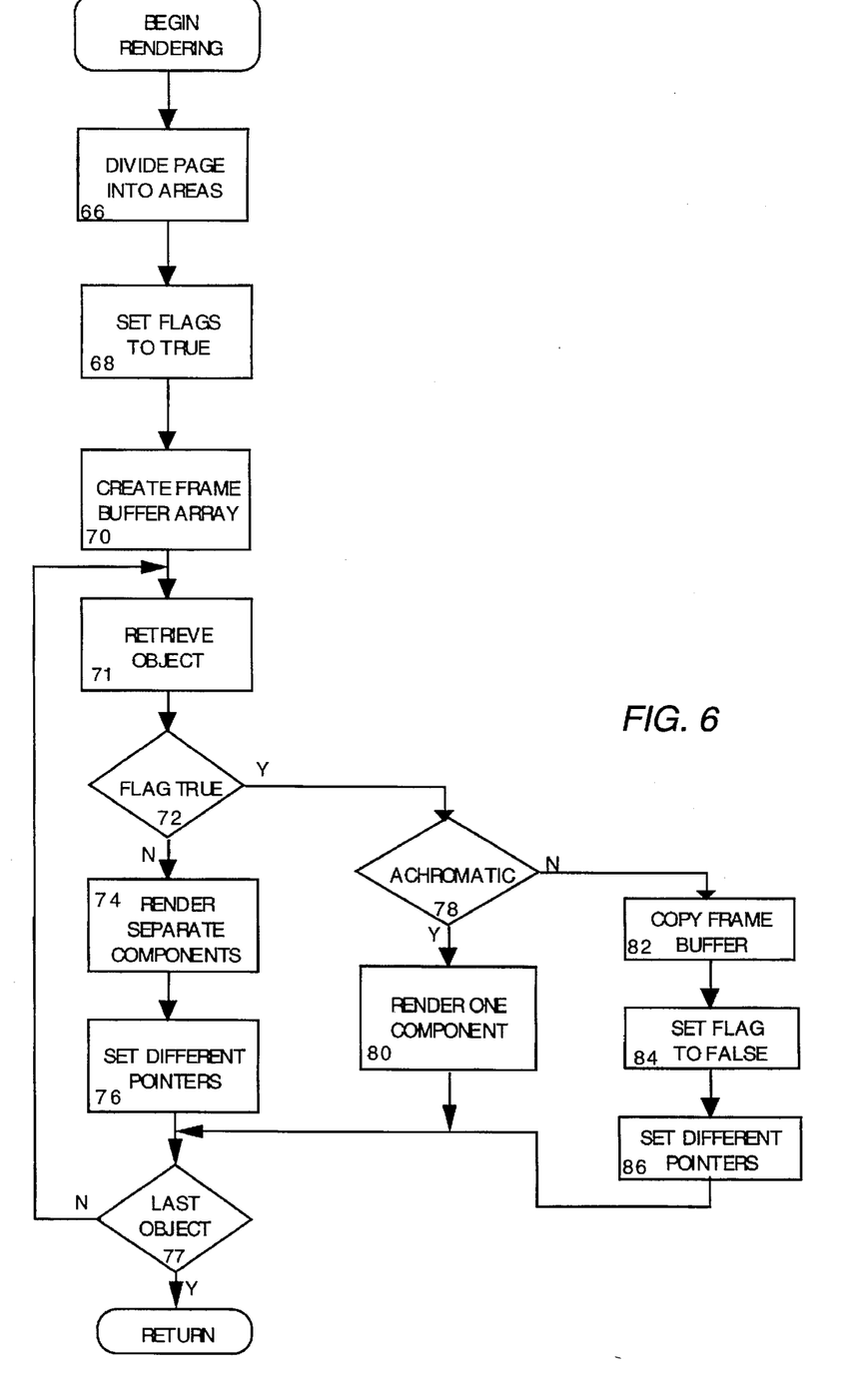
FIG. 6 is a flowchart of the process of the present invention for a printer which does not utilize a display list.

It is not necessary that the invention be implemented in a printer, or other device, of the type in which the image data is stored in an intermediate form, such as a display list. Rather, the invention is also applicable to output devices in which rendering takes place dynamically in response to calls from the interpreter. A flowchart which pertains to this type of operation is illustrated in FIG. 6. Referring thereto, a page of data is divided into non-overlapping areas at step 66, and the achromatic state flag is set to true for each area at step 68, as in the previous example. In addition, a frame buffer array is created at step 70 with three pointers which initially refer to the same frame buffer section. As an object is retrieved, the state flag for each area covered by the object is checked at step 72. If the achromatic state flag is in the false condition, the object is rendered into all three frame buffer sections at step 74, in the conventional manner, and the frame buffer array is initialized with three distinct pointers that respectively refer to the three frame buffer sections at step 76. Alternatively, if the achromatic state flag is true, the current color is checked at step 78 to determine whether it is achromatic. If so, the object is rendered into one frame buffer section at step 80, and the frame buffer array is maintained in its initial state, so that each component points to the single frame buffer section. If, however, the current color is chromatic, the contents of the first frame buffer section are copied into the other two frame buffer sections at step 82, and the achromatic state flag for the affected area is set to false at step 84. In addition, the frame buffer array is reset with pointers to each of the three frame buffer sections at step 86.

From the foregoing, it can be seen that only one color component of the image needs to be rendered for sections of images which contain achromatic data, thereby reducing processing time and increasing the overall efficiency of the printing operation. In all cases, however, the imaging device references three frame buffer sections, which can be multiple references to the same section or individual references to different sections. As a result, both chromatic and achromatic data can be generated in the same image. There is no need to reconfigure the device for monochromatic operation.

It will be appreciated by those of ordinary skill in the art that the present invention can be embodied in other specific forms without departing from the spirit or essential characteristics thereof. For example, although disclosed with specific reference to its implementation in a printer using a CMY color space, the invention is equally applicable to other types of color output devices and other color spaces. Furthermore, the principles of the invention are not limited to image output devices. They can be applied to any process or system in which the different color components of an image are separately processed, for example graphics application programs, or the like. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. In an image output device which represents colors by means of a multi-component color space, a method for generating an image in response to received image data, comprising the steps of:

inspecting said image data to determine whether it represents achromatic data;

rendering said image data to produce a first component pixel map which contains pixel display values for one component of said multi-component color space when said image data represents achromatic data;

providing said pixel display values from said first component pixel map to an image generating device in connection with generation of said one component of said color space by said image generating device; and providing said pixel display values from said first component pixel map to said image generating device in connection with generation of each of the other components of said color space by said image generating device, to produce an achromatic image.

2. The method of claim 1 further including the steps of:

rendering said image data to produce additional component pixel maps which respectively relate to the other components of said color space when the image data does not represent achromatic data; and providing pixel display values from said additional component pixel maps to said image generating device in connection with generation of respective components of said color space, to produce a chromatic image.

3. The method of claim 2 further including the step of creating a data structure which contains a reference to a pixel map for each component of said color space, and wherein the reference for each component refers to said first component pixel map when said image data represents achromatic data.

4. The method of claim 3 wherein said references respectively refer to different component pixel maps when said image data does not represent achromatic data.

5. The method of claim 1 further including the steps of dividing a page of an image into non-overlapping areas, and performing said inspecting step separately for each area.

6. An image producing device of the type in which colors are represented in a multi-component color space, comprising:

means for generating commands to produce images of objects;

means for inspecting said commands to determine whether the images of the objects are achromatic;

a renderer responsive to said commands for storing pixel maps which define an image of an object for respective components of said color space;

an image generating unit for generating an image in accordance with information contained in said pixel maps; and means responsive to said inspecting means for controlling said renderer to render a pixel map for only one of said components when the image of the data is achromatic and for causing said image generating unit to generate images for each of said components in accordance with the information-contained in said one pixel map.

7. In an image generating system in which colors are represented by means of a multi-component color space, a process for producing an image in response to received image data, comprising the steps of:

storing the image data in an intermediate form;

inspecting the image data as it is being stored to determine whether it represents an achromatic image;

storing an identification whether the image data represents achromatic data;

processing said image data with respect to one component of said color space and storing the processed image data; and repeatedly retrieving the stored image data pertaining to said one component for each of the components of said color space, respectively, to produce an image when said identification indicates that the image data represents achromatic data.

8. The process of claim 7 further including the steps of processing and storing the image data with respect to each of the other components of said color space when said identification indicates that the image data is not achromatic, and separately retrieving the stored image data for the respective associated components of said color space, to produce an image.

9. The process of claim 7 wherein said processing step comprises a rendering process in which object-based image data is converted into pixel-based image data with respect to said one component.

10. In an image generating system in which colors are represented by means of a multi-component color space, a process for producing an image in response to received image data, comprising the steps of:

inspecting said image data to determine whether it represents achromatic data;

processing said image data with respect to one component of said color space and storing the processed image data;

repeatedly retrieving the stored image data for each component of said color space, respectively, to produce an image when the image data represents achromatic data;

detecting that the image data does not represent achromatic data;

copying the stored processed data into memory storage locations associated with each of the other components of said color space; and separately retrieving the stored image data for the respective associated components of said color space to produce an image when the image data does not represent achromatic data.

11. The process of claim 10 including the further step of processing and storing additional data with respect to all of the components of said color space.

12. The process of claim 10 wherein said processing step comprises a rendering process in which object-based image data is converted into pixel-based image data with respect to said one component.

* * * * *